Patented Sept. 20, 1932

1,878,682

UNITED STATES PATENT OFFICE

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN

MULTISTAGE GAS PURIFICATION

No Drawing.   Application filed November 3, 1928. Serial No. 317,125.

This invention relates to a method of purifying gases by passing them through a series of purifiers which operate under successively higher pressures. Such purifiers containing material of a nature such that when the gas to be purified is passed over it, the impurities are partially or substantiallly removed, the first or low pressure purifier removing a large proportion of the absorbable impurities while the succeeding higher pressure purifier or purifiers substantially remove the residual absorbable impurities left in the gas coming from the purifier.

One of the principal objects of this invention is to reduce the leakage difficulties now encountered in most purifying processes wherein the gas to be purified is passed through the purifier at high pressure, requiring frequent opening of such purifier to replenish the purifying material. A further object is to decrease the excessive venting loss encountered when frequent opening of such equipment is necessary. Other objects will become apparent as the description of the process proceeds.

To the accomplishment of the foregoing and related ends, the invention, then, consists of the method and steps hereinafter fully described and particularly pointed out in the claims, the following description setting forth in detail one mode of carrying out the invention, such disclosed mode illustrating, however, but one of the various ways in which the principles of the invention may be used.

In general this process consists in passing the gas or gases to be purified through a compressor into the first purifier which removes a high percentage of the absorbable impurities. The gas or gases are then compressed to a considerably higher pressure and passed through a second purifier which will remove a large portion of the residual absorbable impurities. If desired the gas or gases may be further compressed and purified prior to delivery to the point of use.

For example when purifying the hydrogen-nitrogen gas mixture used to produce synthetic ammonia, the gas is passed through the first stage or stages of compression, approximating 2 to 6 atmospheres, following which it is passed through a purifier having its contained surfaces coated with fused alkali metal hydroxide. This coating may consist of caustic soda, caustic potash or a mixture of the two. When using a mixture of the two I prefer to use the eutectic mixture which contains approximately 46.9% potassium hydroxide relative to 53.1% sodium hydroxide and has a melting point of approximately 185° C. which is the lowest obtainable for a mixture of these two alkalies. This one purification will under favorable conditions remove as high as 90% of the absorbable impurities, e. g. carbon dioxide, carbon monoxide (part), water vapor, free halogens, hydrogen sulphide, sulphur dioxide and other acidic impurities contained in the gas mixture. The gas mixture is then further compressed to substantially reaction pressure, amounting to 200 to 500 atmospheres in the Haber-Bosch process, and then passed through a second purifier of similar type, which will remove a large portion of the residual absorbable impurities leaving the gas mixture substantially free from such impurities. This method of purifying the gas or gas mixture allows the low pressure purifier to absorb the bulk of the absorbable impurities while the high pressure purifier is only called upon to remove the relatively small amount of residual absorbable impurities remaining.

The above described method wherein the bulk of the absorbable impurities is removed at low or intermediate pressure, has the advantage of avoiding excessive leakage which is frequently encountered where high pressure equipment is subjected to more or less frequent opening and closing, such as is required in this case for the purpose of replenishing the purifying material. A further advantage is that the weight of gas vented and the power loss represented therein each time replenishment of purifying material is necessary, is less than the like loss encountered when it is necessary to vent a purifier containing highly compressed gas, as can be readily appreciated by anyone versed in the art.

While my improved method may in some cases be used as the only purification for the raw gases, it may in some instances be used to better advantage if the raw gases are given a preliminary scrubbing such as with water, cuprous solution, aqueous caustic alkali or similar material.

In some cases it may be of advantage to pass the gas or gases to be purified through a series of purifiers containing different purification materials some of which may use catalytic conversion of the impurities and others absorption. For instance, when purifying hydrogen-nitrogen gas mixtures, after the preliminary washing step the gases may be passed over heated copper to remove sulphur and its compounds as well as phosphine. The gases may then be passed over or through liquid ammonia, caustic alkali or other material in suitable manner to remove such impurities as carbon monoxide, carbon dioxide and water vapor. If desired, the gases may be further purified by passing them through a purifier containing some of the same material that is used as catalyst in the reactor. This material will absorb the impurities that would reduce the efficiency of the catalyst used in the process. Materials such as iron, copper or nickel can be used catalytically to convert some of the impurities to water and impurities of lesser importance prior to the water vapor removal step.

While my invention has been described in terms of purifying hydrogen-nitrogen gas mixtures used in producing synthetic ammonia I do not wish to be limited to that field as my invention is equally applicable to purifying either hydrogen or nitrogen alone or any gas or gas mixture that may be purified by scrubbing or contacting with a suitable material that will remove absorbable impurities at pressures in excess of atmospheric.

Other modes of applying the principle of my invention may be employed instead of those explained, change being made as regards the method herein disclosed, provided the step or steps stated by any of the following claims or the equivalents of such stated step or steps be employed.

I therefore particularly point out and distinctly claim as my invention:—

1. The method of multi-stage gas purification which consists in passing the gas to be purified through a series of purification stages wherein the purifying agent is retained in each stage and the gas going to each purifier is compressed to a higher pressure than that attained in the preceding one.

2. The method of multi-stage gas purification which consists in passing the gas to be purified through a preliminary scrubbing stage following which it is passed through a series of purification stages wherein the purifying agent is retained in each stage and the gas going to each purifier is compressed to a higher pressure than that attained in the preceding one.

3. The method of multi-stage gas purification which consists in passing the gas to be purified through a series of purifier stages wherein the contained surfaces of each purifier are coated with alkali metal hydroxide.

4. The method of multi-stage gas purification which consists in passing the gas to be purified through a series of purifier stages wherein the contained surfaces of each purifier are coated with alkali metal hydroxide and each succeeding stage operates at a higher pressure than the preceding one.

5. The method of multi-stage gas purification which consists in passing a nitrogen-hydrogen gas mixture through a series of purifier stages wherein the contained surfaces of each purifier are coated with alkali metal hydroxide.

6. The method of multi-stage gas purification which consists in passing a nitrogen-hydrogen gas mixture through a series of purifier stages wherein the contained surfaces of each purifier are coated with a mixture of alkali metal hydroxides and each succeeding stage operates at a higher pressure than the preceding one.

7. The method of multi-stage gas purification which consists in passing the gas to be purified through a series of purifier stages wherein the contained surfaces of each purifier are coated with a mixture of alkali metal hydroxides.

8. The method of multi-stage gas purification which consists in passing the gas to be purified through a series of purifier stages wherein the contained surfaces of each purifier are coated with a mixture of alkali metal hydroxides and each succeeding stage operates at a higher pressure than the preceding one.

9. The method of multi-stage gas purification which consists in passing a nitrogen-hydrogen gas mixture through a series of purifier stages wherein the contained surfaces of each purifier are coated with a mixture of alkali metal hydroxides.

10. The method of multi-stage gas purification which consists in passing the gas to be purified through a series of purifier stages wherein the contained surfaces of each purifier are coated with the eutectic mixture of alkali metal hydroxides and each succeeding stage operates at a higher pressure than the preceding one.

11. The method of multi-stage gas purification which consists in passing a nitrogen-hydrogen gas mixture through a series of purifier stages wherein the contained surfaces of each purifer are coated with the eutectic mixture of alkali metal hydroxides and each succeeding stage operates at a higher pressure than the preceding one.

12. The method of multi-stage gas purification which consists in passing the gas mixture to be purified through a preliminary scrubbing stage following which it is passed through a series of purifier stages wherein the contained surfaces of each purifier are coated with alkali metal hydroxide.

13. The method of multi-stage gas purification which consists in passing the gas mixture to be purified through a preliminary scrubbing stage following which it is passed through a series of purifier stages wherein the contained surfaces of each purifier are coated with a mixture of alkali metal hydroxides.

14. The method of multi-stage gas purification which consists in passing the gas mixture to be purified through a preliminary scrubbing stage following which it is passed through a series of purifier stages wherein the contained surfaces of each purifier are coated with the eutectic mixture of alkali metal hydroxides.

15. The method of multi-stage gas purification which consists in passing a nitrogen-hydrogen gas mixture through a preliminary scrubbing stage, then compressing said gas mixture and passing it through a purifier, further compressing said gas and passing it through a second purifier, wherein the contained surfaces of each purifier are coated with alkali metal hydroxide and each succeeding stage operates at a higher pressure than the preceding one.

16. The method of multi-stage gas purification which consists in passing a nitrogen-hydrogen gas mixture through a preliminary scrubbing stage, then compressing said gas mixture and passing it through a purifier, further compressing said gas and passing it through a second purifier, wherein the contained surfaces of each purifier are coated with a mixture of alkali metal hydroxides and each succeeding stage operates at a higher pressure than the preceding one.

17. The method of multi-stage gas purification which consists in passing a nitrogen-hydrogen gas mixture through a preliminary scrubbing stage, then compressing said gas mixture and passing it through a purifier, further compressing said gas and passing it through a second purifier, wherein the contained surfaces of each purifier are coated with the eutectic mixture of alkali metal hydroxides and each succeeding stage operates at a higher pressure than the preceding one.

Signed by me this 29 day of October, 1928.

HERBERT H. DOW.